Patented Oct. 16, 1928.

1,688,054

UNITED STATES PATENT OFFICE.

GEORGE W. MOREY, OF CHEVY CHASE, MARYLAND.

TRIBARIUM ALUMINATE AND PROCESS OF PREPARING THE SAME.

No Drawing.   Application filed November 23, 1925.   Serial No. 71,024.

This invention relates to the new material tribarium aluminate and to a process of preparing the same.

One of the objects of the invention is to produce a soluble barium salt from barium sulphate or barium carbonate. The soluble salt is of particular use as a basis of the barium hydroxide used in the precipitation of saccharates from molasses.

Heretofore it has been the practice in the barium industry, in order to produce barium hydroxide, to use barytes (barium sulphate) as raw material, roasting it with coal to form barium sulphide, next leaching out the barium sulphide from the unconverted residue; then further converting the barium sulphide solution into barium carbonate, and finally into soluble compounds such as barium hydroxide and barium chloride. Substantial loss of barium has resulted. The conversions are incomplete at the end of each step of the process, and accordingly they may fairly be considered inefficient.

As contrasted to the above mentioned prior processes, that of the present invention provides an improved process which is not complicated, is inexpensive, and in which all material handled enters into the combination and there is no loss of barium.

The present invention makes possible the production of soluble barium hydroxide and soluble tribarium aluminate with the utmost simplicity. The latter is formed in a single step, and the former by only two steps. The yields are high in soluble barium materials, and the costs are low.

The preferred method of preparing tribarium aluminate is as follows. A mixture is prepared of amounts of barium sulphate, or barium corbonate, with alumina in amounts required to combine in molecular proportions to form tribarium aluminate ($3BaO.Al_2O_3$), a compound containing 81.85 per cent BaO and 18.15 $Al_2O_3$. The alumina may be anhydrous alumina or in any other form, such as bauxite, provided any additional material with which the alumina may be combined must be volatilizable during the process.

The mixture of barium sulphate and alumina, or barium carbonate and alumina, should be reduced to a fineness of at least 100 mesh, and may then be introduced into a furnace in dry or wet condition. Any suitable furnace capable of withstanding a temperature of 1300 degrees to 1400 degrees C. will serve for the furnacing operation, but preferably a rotary kiln is used, such as may have a proper refractory lining, and preferably 100 to 150 feet long. The type of kiln used in the manufacture of Portland cement is satisfactory for the furnacing operation. The furnacing of the mixture is continued until the acidic content of the barytic material is volatilized and driven off. It will be observed that no reducing agents are used and that all of the materials used enter into the final combination.

The time required for the conversion of the mixture to a condition in which substantially all of the $SO_3$ from barium sulphate, or the $CO_2$ from barium carbonate, has been driven off and the tribarium aluminate formed, will vary from one to four hours with the temperature and length of the furnace or rotary kiln. The fuel used may be oil, gas, powdered coal, or any convenient fuel capable of maintaining the desired temperature, and which will not appreciably contaminate the product with the products of combustion. The temperature should range from at least 1150° C. to at least 1400° C. to secure the most complete conversion.

The furnace product or clinker consists primarily of tribarium aluminate, and usually also some free barium oxide, and the product dissolves almost completely in hot water, leaving only a small insoluble residue. The solution may be used for most purposes for which barium hydroxide is used, or barium hydroxide may be crystallized out of the solution. With an excess of barium present in the original mixture there results in the product, along with the tribarium aluminate, an amount of barium oxide, but if there be a deficiency of barium in the original mixture then, along with the tribarium aluminate will be some monobarium aluminate.

The compound tribarium aluminate resulting from the furnacing has the following properties. It has a melting point above 1600° C. It consists of weakly birefringent crystals having the refractive index 1.81.

The present process is not limited to the production of exact tribarium aluminate alone, as above specified of proportions 81.85 BaO and 18.15 $Al_2O_3$, as it is commercially practicable to produce a furnace product containing more or less barium oxide, BaO, than the figures above specified. For example, a furnace product has been formed consisting of tribarium aluminate and free barium oxide, the total per cent of BaO present being ninety (90); and also with different mixtures there has been formed a product consisting of tribarium aluminate and monobarium aluminate. It is desirable to vary the proportions of BaO and $Al_2O_3$ as the mixture is fed to the furnace within reasonable limit, depending upon whether it is desired to obtain high yields of BaO or relatively high yields of soluble $Al_2O_3$.

It will be understood that the tribarium aluminate is a very convenient raw material for conversion into any desired barium salt, such as barium chloride and barium nitrate, and others.

What I claim is:—

1. As a new product of manufacture, a furnace product consisting chiefly of tri-barium aluminate and having present small amounts of free barium oxide.

2. A water soluble barium compound having a melting point above 1600° C. and consisting of weakly birefringent crystals having the refractive index 1.81.

3. As a new product of manufacture, a further product consisting chiefly of tri-barium aluminate and having present small amounts of free barium oxide and characterized by having a melting point above 1600° C. and consisting of weakly birefringent crystals with a refractive index of 1.81.

4. As a new product of manufacture, tri-barium aluminate corresponding substantially to the formula $3BaO.Al_2O_3$.

5. The process of producing tri-barium aluminate, which process consists of heating a mixture consisting solely of a salt of barium and alumina in a furnace and thus producing tri-barium aluminate in a single step.

6. The process of producing tri-barium aluminate, which process consists of heating a mixture consisting solely of a salt of barium and alumina in a furnace and driving off the acid radical from the barium salt and thus producing tri-barium aluminate in a single step.

7. The process of producing tri-barium aluminate, which process consists of heating the mixture consisting solely of a salt of barium and an hydrous alumina in the furnace and thus producing tri-barium aluminate in a single step.

8. The process of producing tri-barium aluminate, which process consists of subjecting a mixture consisting solely of a salt of barium and alumina in a furnace to a heat treatment of at least 1150° C. and thus producing tri-barium aluminate in a single step.

9. The process of producing barium salts, which consists in heating a barium salt having a volatilizable acid radical to at least 1150° C. in the presence of a second material consisting solely of alumina.

10. The process of producing a furnace product consisting chiefly of tri-barium aluminate and having present a small amount of free barium oxide, which process consists of heating in a furnace at a temperature of at least 1150° C. a mixture of a salt of barium and a second material consisting solely of alumina.

11. The process of producing tri-barium aluminate which process consists of reducing a mixture of a barium salt and alumina to a fineness of at least 100 mesh, heating the mixture consisting solely of said barium salt and alumina to a temperature of at least 1150° C., and thereby driving off the acid radical and forming tri-barium aluminate.

12. The process of converting barium compounds which are insoluble in water into water soluble compounds, which process comprises heating non-water soluble barium salt materials in the presence of a second material consisting solely of alumina, and to a temperature of at least 1150° C., and thus producing water soluble compounds in a single step.

13. The process of converting barium compounds which are insoluble in water into water soluble compounds, which process comprises heating in a furnace a mixture of a non-water soluble barium salt and alumina and at a temperature of at least 1150° C. and thus producing in a single step a water soluble compound.

14. The process of producing tri-barium aluminate which process consists of heating a mixture consisting solely of barium carbonate and alumina in a furnace and thus producing tri-barium aluminate in a single step.

15. The process of producing tri-barium aluminate which process consists of treating a compound, which compound includes a combination of barium with an acidic oxide capable of being volatilized, by heating it in the presence of a second material consisting solely of alumina and thus producing tri-barium aluminate in a single step.

16. The process of producing tri-barium aluminate which process consists of treating a compound of barium and an acidic oxide, and the acidic oxide of which is capable of being volatilized, by heating it in the presence of a second material consisting solely of alumina in a furnace at a temperature of at least 1150° C. and thus producing tri-barium aluminate in a single step.

In testimony whereof I affix my signature.

GEORGE W. MOREY.